United States Patent
Soga et al.

(10) Patent No.: US 7,522,385 B2
(45) Date of Patent: Apr. 21, 2009

(54) ROTATING DISK STORAGE DEVICE WITH SUPPRESSED ARM FLUTTERING

(75) Inventors: Eiji Soga, Kanagawa (JP); Satoshi Hayakawa, Kanagawa (JP); Takeshi Chawanya, Kanagawa (JP); Kohichi Takeuchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 423 days.

(21) Appl. No.: 10/996,288

(22) Filed: Nov. 22, 2004

(65) Prior Publication Data

US 2005/0141135 A1   Jun. 30, 2005

(30) Foreign Application Priority Data

Dec. 26, 2003   (JP)   ............................. 2003-433175

(51) Int. Cl.
G11B 21/02   (2006.01)
G11B 33/14   (2006.01)

(52) U.S. Cl. .................. 360/266; 360/97.02; 360/265.9

(58) Field of Classification Search .............. 360/97.02, 360/97.03, 265.9, 266
See application file for complete search history.

(56) References Cited

U.S. PATENT DOCUMENTS

| | | | | |
|---|---|---|---|---|
| 4,175,275 A | * | 11/1979 | Schaefer | 360/244.9 |
| 5,854,725 A | * | 12/1998 | Lee | 360/266 |
| 5,999,372 A | * | 12/1999 | Peterson et al. | 360/265.9 |
| 6,219,203 B1 | * | 4/2001 | Arya et al. | 360/244.2 |
| 6,366,432 B1 | * | 4/2002 | Tadepalli et al. | 360/266 |
| 6,397,699 B1 | * | 6/2002 | Ikemoto et al. | 74/490.01 |
| 6,441,998 B1 | * | 8/2002 | Abrahamson | 360/137 |
| 6,473,271 B1 | * | 10/2002 | Rahman et al. | 360/266 |
| 6,597,540 B2 | * | 7/2003 | Tsuda et al. | 360/265.9 |
| 6,614,626 B2 | * | 9/2003 | Raphael et al. | 360/266 |
| 6,826,009 B1 | * | 11/2004 | Scura et al. | 360/97.03 |
| 6,950,286 B2 | * | 9/2005 | Huynh | 360/265.9 |
| 6,961,219 B2 | * | 11/2005 | Asano et al. | 360/266 |
| 7,016,157 B1 | * | 3/2006 | Williams et al. | 360/265.7 |
| 7,130,158 B2 | * | 10/2006 | Kubotera et al. | 360/266 |
| 7,154,712 B2 | * | 12/2006 | Hayakawa et al. | 360/265.9 |
| 2003/0016473 A1 | * | 1/2003 | Kim | 360/266 |
| 2004/0012893 A1 | * | 1/2004 | Tadepalli | 360/266 |
| 2005/0280947 A1 | * | 12/2005 | Fan et al. | 360/265.7 |
| 2006/0114614 A1 | * | 6/2006 | Tsujino et al. | 360/266 |

FOREIGN PATENT DOCUMENTS

| | | | | |
|---|---|---|---|---|
| JP | 62279570 A | * | 12/1987 | |
| JP | 63201967 A | * | 8/1988 | |
| JP | 04109468 A | * | 4/1992 | |

(Continued)

*Primary Examiner*—William J Klimowicz
(74) *Attorney, Agent, or Firm*—Townsend and Townsend and Crew LLP; John Henhaus

(57) ABSTRACT

An actuator arm with suppressed arm fluttering is provided. On a main surface of each actuator arm in an actuator arm unit there are formed a rigid area which extends centrally in the longitudinal direction and flow uniformizing areas which are each formed in a substantially flat shape extending longitudinally in adjacency to the rigid area and which are thinner than the rigid area. A balance aperture is not formed in the portion where the flow uniformizing areas and the rigid area are formed, to diminish arm fluttering. Instead of a balance aperture, the flow uniformizing areas also exhibit the effect of reducing the weight of the actuator arm.

8 Claims, 6 Drawing Sheets

FOREIGN PATENT DOCUMENTS

| | | | | |
|---|---|---|---|---|
| JP | 09139039 A | * | 5/1997 | |
| JP | 2000137967 A | * | 5/2000 | |
| JP | 2002358743 A | * | 12/2002 | |
| JP | 2003-085942 | | 3/2003 | |
| JP | 2004272974 A | * | 9/2004 | |
| WO | WO 01/73765 | | 10/2001 | |
| WO | WO 03/021578 A1 | | 3/2003 | |

* cited by examiner

PRIOR ART

PRIOR ART

ROTATING DISK STORAGE DEVICE WITH SUPPRESSED ARM FLUTTERING

CROSS-REFERENCES TO RELATED APPLICATIONS

This application claims priority from Japanese Patent Application No. JP2003-433175, filed Dec. 26, 2003, the entire disclosure of which is incorporated herein by reference.

BACKGROUND OF THE INVENTION

The present invention relates to a technique for suppressing oscillation of an actuator head suspension assembly in a rotating disk storage device such as a magnetic disk drive or a magneto-optic disk drive and more particularly to a technique for suppressing fluttering of an actuator arm caused by an air flow generated on a surface of a rotating disk.

A magnetic disk drive as an example of a rotating disk storage device includes a magnetic disk, which has a magnetic layer formed on a surface thereof and is adapted to rotate about a spindle shaft, an actuator head suspension assembly (hereinafter referred to as "AHSA"), and a control unit for controlling the transfer of data and the operation of the device. The AHSA includes a head suspension assembly (hereinafter refer to as "HSA") and an actuator assembly. The HSA includes a head which makes access to the magnetic disk for performing both or one of read and write of data, a slider to which the head is attached and which is provided with an air bearing surface (hereinafter refer to as "ABS"), a spring structure called flexure to which the slider is attached, and a load beam which supports the flexure. The actuator assembly includes an actuator arm which supports the HSA, a voice coil which constitutes a voice coil motor (hereinafter refer to as "VCM"), a coil support which holds the voice coil, and a pivot bearing housing.

A head/slider constituted by a head and a slider floats by an extremely slight height on the surface of the magnetic disk which is rotating, while being supported by the flexure and performing a pivotal motion, and is positioned to a predetermined track position, then is controlled so as to perform a follow-up operation for tracks. Servo information is recorded in each track. The control unit calculates an error between a target position and the present position from the servo information read by the head and then controls the VCM so that the head floats centrally of a track, while allowing the AHSA to perform a correcting operation. If the head should undergo an unexpected displacement due to, for example, oscillation or shock while the control unit makes a positional control for the head, a longer time than necessary may be consumed until the head is positioned to a predetermined track, or the head may access an erroneous track.

With improvement in recording density of the magnetic disk drive, the accuracy required at the time of positioning the head to a predetermined track is becoming increasingly strict. In the magnetic disk drive, an air flow, which is created on the surface of the magnetic disk so as to advance in the rotating direction of tracks with high-speed rotation of the disk, is utilized for imparting buoyancy to the slider. While the head reads or writes data, the air flow created on the disk surface collides with the ASHA and causes a change in flow velocity. A natural oscillation is usually developed in the actuator arm which is driven by the VCM. If a change in flow velocity of the air flow occurs in the vicinity of the actuator arm, the amplitude of the natural oscillation increases and an oscillation called arm fluttering results, which affects the positional control for the head.

Displacement modes caused by oscillation of the actuator arm there include bending, sway, and torsion. Bending is a displacement of the actuator arm in a direction perpendicular to the surface of the magnetic disk. Sway is a displacement in the pivoting direction of the actuator arm. Torsion is a displacement in a direction rotating about a virtual center line extending in the longitudinal direction of the actuator arm. The larger the number of revolutions of the magnetic disk, the higher the velocity of the air flow and the more marked the arm fluttering. Further, the larger the number of stacked magnetic disks, that is, the larger the number of actuator arms, the greater the influence of the air flow exerted on the whole of the AHSA and the more marked the arm fluttering.

As a track pitch has recently been becoming increasingly narrow in quick tempo, the necessity of preventing arm fluttering has become stronger than before. In addition, it has been proposed to increase the number of magnetic disks to be stacked for the purpose of increasing capacity or increase the number of revolutions of the magnetic disk for the purpose of improving the access speed. With these as background, the prevention of arm fluttering is becoming an important issue. U.S. Pat. No. 5,446,612 and U.S. Published Patent Application No. 2003-16473 disclose techniques for suppressing the disturbance of an air flow to suppress fluttering caused by an actuator arm.

FIG. 1 is a perspective view of a conventional AHSA 10. The AHSA 10 includes a pivot bearing housing 11, a coil support 14, a voice coil 16, an actuator assembly composed of actuator arms 12a to 12d, and HSAs 18a to 18f connected to the actuator assembly. In the same figure, four actuator arms 12a to 12d are stacked. When the head accesses a magnetic disk, the disk is in a rotating condition between adjacent actuator arms. One set of HSA is connected to each of the top and bottom actuator arms, while two sets of HSAs are connected to each of the other two actuator arms 12b and 12c which are stacked inside. Therefore, the actuator arms 12a to 12d are each influenced by an air flow created on the surface of a magnetic disk opposed thereto.

Each of the actuator arms 12a to 12d is formed with three balance apertures 5, which are for taking the balance of the entire weight of the AHSA centered on a pivot shaft. That is, by setting the center of gravity of the AHSA on the pivot shaft, even if a shock which involves a parallel movement is given to the magnetic disks from the exterior, the AHSA is prevented from pivoting to minimize the influence on the positioning accuracy. Further, the operation characteristic of the AHSA is improved by taking the weight balance.

BRIEF SUMMARY OF THE INVENTION

The actuator arms 12a to 12d described above is of a cantilevered structure wherein they are fixed at one ends to the pivot bearing housing 11. Therefore, once there occurs arm fluttering, oscillation is transferred to head/sliders attached to the tips of the HSAs 18a to 18f. FIG. 2 is a schematic sectional view taken on line A-A of the actuator arm 12b shown in FIG. 1. In FIG. 2, an upper surface 61 and a lower surface 63 are surfaces of the actuator arm 12b opposed to magnetic disks. An inner side face 65 and an outer side face 67 are faces which define an arm shape in the pivoting direction of the actuator assembly. The inner side face 65 is closer to the spindle shaft when the AHSA 10 is mounted.

Arrow D in FIG. 2 indicates a rotating direction of magnetic disks. Air flows W1 and W2 created in the direction of arrow D advance as uniform flows if they are spaced a certain distance from the upper surface 61 and lower surface 63 of the actuator arm 12b. On the other hand, air flows advancing close to the upper and lower surfaces 61, 63 of the actuator arm 12b collide with the inner side face of the actuator arm 12. Further, at the portion of the outer side face 67, there arises a change in flow velocity due to an abrupt change in atmospheric pressure, giving rise to a vortex flow or a turbulent flow.

In the aperture 5, the air flows become air flows W4 and W5 advancing to opposite sides while involving changes in flow velocity, or at an aperture edge 6, the air flows become vortex flows W3 and W6, giving rise to pressure differences at uncertain positions on the upper and lower surfaces 61, 63 of the actuator arm 12b. The turbulent flows generated in the aperture 5 are coupled with the turbulent flows generated at the inner and outer side faces 65, 67 and increase the amplitude of a natural oscillation of the actuator arm 12b, with consequent arm fluttering.

Accordingly, it is a feature of the present invention to provide a rotating disk storage device capable of suppressing arm fluttering of an actuator arm which constitutes an AHSA and having improved head controllability. It is another feature of the present invention to provide a rotating disk storage device with an actuator arm mounted thereon, the actuator arm having an arm-fluttering-suppressing structure which can be fabricated easily.

A feature of the present invention resides in a structure wherein the apertures which cause arm fluttering are not formed in the actuator arm, the resulting increase in weight is compensated for by forming a flow uniformizing area having a structure to diminish a change in flow velocity which occurs at an end portion of the actuator arm, and a rigid area is formed centrally to ensure rigidity.

According to a first aspect of the present invention there is provided a rotating disk storage device comprising a rotating disk storage medium supported rotatably on a base, a head accessible to the rotating disk storage medium, and an actuator arm carrying the head thereon and supported on the base for pivoting movement, the actuator arm including a main surface spreading in a pivoting direction thereof, the main surface having a longitudinally centrally extending rigid area and a flow uniformizing area adjacent to the rigid area and thinner than the rigid area, the flow uniformizing area being formed in a longitudinally extending, substantially flat shape.

The main surface of the actuator arm spreads in the pivoting direction and is opposed to the rotating disk storage medium, and an air flow created by rotation of a magnetic disk advances on the main surface. On the main surface, however, the rigid area extends longitudinally centrally of the actuator arm, providing a well-balanced rigid structure. Further, the flow uniformizing area extends longitudinally in adjacency to the rigid area, so that it is possible to diminish a change in flow velocity which is caused by collision of the air flow with a side face of the actuator arm. Since the flow uniformizing area is thinner than the rigid area, it also plays the role of reducing the weight of the entire actuator arm. Thus, in the actuator arm used in embodiments of the present invention, it is not necessary to form a balance aperture to take a weight balance of the entire actuator assembly.

Forming the flow uniformizing area on both sides of the rigid area is convenient because both weight and rigidity of the actuator arm are well-balanced in a torsional direction. If the rigid area and the flow uniformizing area are formed on each of a first main surface and a second main surface, both main surfaces will exhibit an arm fluttering suppressing effect in the case where the actuator arm is disposed between two stacked rotating disk storage media. If the flow uniformizing area formed on the first main surface and the flow uniformizing area formed on the second main surface are made approximately parallel to each other, it is possible to facilitate machining in comparison with the case where a flow uniformizing area is inclined or is formed as flat surfaces including plural thicknesses. In this connection, when the rigid area includes a substantially flat surface, if the thickness of the flow uniformizing area is set in the range of about 30% to 70% of the thickness of the rigid area, there accrues a convenience in both machining and the balance between both areas.

In the case where with only the formation of the flow uniformizing area it is virtually impossible to take a predetermined weight balance, it is preferable to form an aperture between the rigid area and a proximal portion of the actuator arm. The proximal portion of the actuator arm is wide in the pivoting direction and high in rigidity because of its proximity to a pivot bearing housing, so even if the aperture is formed, there will be little influence on arm fluttering. If the flow uniformizing area is adjacent to the rigid area along an arcuate boundary, then when the actuator arm moves to an outer periphery of a track especially high in flow velocity, the air flow advances along the arcuate shape, which is more effective in suppressing the arm fluttering. The arcuate shape as the boundary shape permits a larger amount of a thick portion to remain on the proximal side of the actuator arm and is thus convenient for enhancing rigidity. If a slant surface is formed at the boundary between the flow uniformizing area and the rigid area, the air flow can flow from the flow uniformizing area to the rigid area without undergoing any significant change in flow velocity.

According to a second aspect of the present invention there is provided a rotating disk storage device comprising a rotating disk storage medium supported rotatably on a base, a head accessible to the rotating disk storage medium, and an actuator arm carrying the head thereon and supported on the base for pivoting movement, the actuator arm including a main surface spreading in a pivoting direction thereof, the main surface having a longitudinally centrally extending rigid area and a flow uniformizing area adjacent to the rigid area and thinner than the rigid area, the flow uniformizing area being formed in a longitudinally extending, substantially flat shape, wherein the actuator arm is formed by cutting an actuator stock formed by die casting, extrusion, or drawing.

The rigid area and the flow uniformizing area of the actuator arm according to embodiments of the present invention are of a structure suitable for forming the actuator arm by cutting an actuator stock with a milling cutter, the actuator stock being formed by die casting for example. By selecting a metal as the actuator stock and cutting the metal with a milling cutter, it is possible to form an actuator arm unit integrally. By going through the steps of first cutting the flow uniformizing area with a milling cutter and then cutting out an actuator arm simultaneously with subsequent formation of the rigid area, it is possible to facilitate the manufacturing process. Conveniently, a cutting trace with the milling cutter serves as an arcuate boundary between the rigid area and the flow uniformizing area and also serves as a slant surface formed at the boundary. Further, if the area of the flow uniformizing area is set at a value in the range of about 10% to 70% of a total area of the area of the flow uniformizing area and an area of the rigid area, it is possible to display an effect. If it is set in the range of about 30% to 70% of the said total area, there can be attained a structure suitable for reducing the weight of the actuator arm and for ensuring the rigidity thereof.

According to embodiments of the present invention there could be provided a rotating disk storage device capable of suppressing arm fluttering of an actuator arm as a constituent of an AHSA and having improved head controllability. Further, there could be provided a rotating disk storage device with an actuator arm mounted thereon, the actuator arm having an arm fluttering suppressing structure capable of being fabricated easily.

DETAILED DESCRIPTION OF THE INVENTION

Explanation of Magnetic Disk Drive

Figure 1:
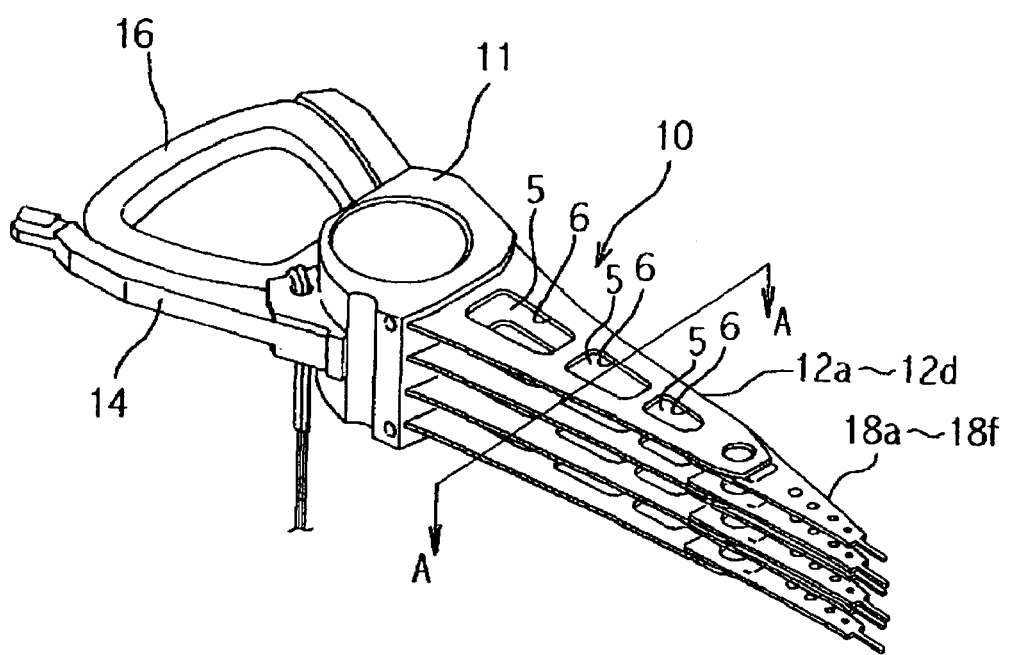
FIG. 1 is a perspective view of a conventional actuator head suspension assembly.

A magnetic disk drive according to an embodiment of the present invention will be described hereinbelow with reference to the accompanying drawings. In the following description and the drawings, the same components are identified by the same reference numerals.

Figure 3:
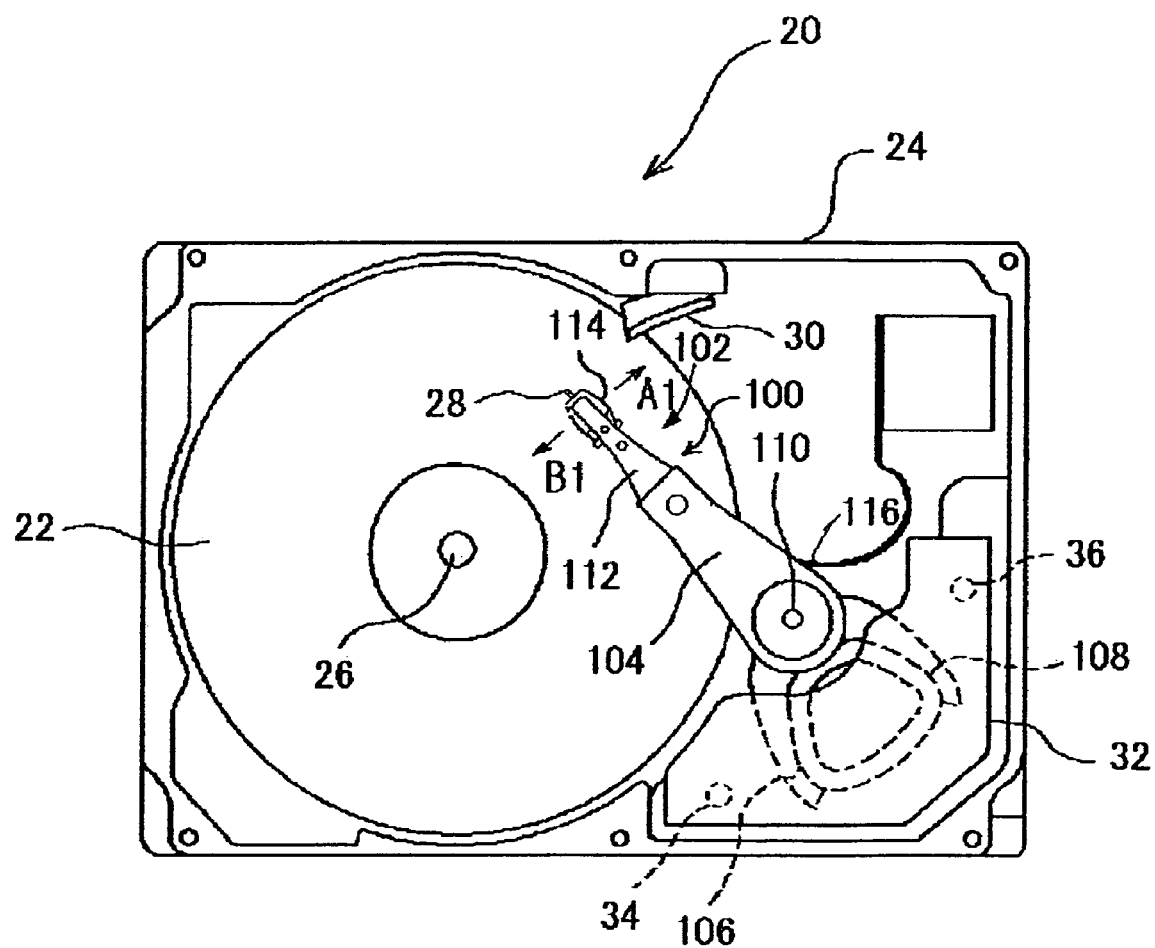
FIG. 3 is a diagram showing a schematic construction of a magnetic disk drive according to an embodiment of the present invention.

FIG. 3 is a plan view showing a schematic construction of a magnetic disk drive 20 according to an embodiment of the present invention. In the magnetic disk drive 20, which is an example of a rotating disk storage device, various components are mounted on a base 24 of a disk enclosure. A magnetic disk 22, which is an example of a rotating disk storage medium, is provided on both sides with recording surfaces each having a magnetic layer formed thereon. The magnetic disk 22 is secured to a hub as a constituent of a spindle motor (hereinafter refer to as "SPM") disposed at a lower position and is adapted to rotate about a spindle shaft 26. In this embodiment five magnetic disks 22 are stacked in parallel, but in the present invention the number of magnetic disks is not limited to five. Generally, the larger the number of stacked magnetic disks, the greater the arm fluttering, and therefore the present invention is more advantageous for a magnetic disk drive having the larger number of disks.

The magnetic disk drive 20 adopts a load/unload system provided with a ramp 30 in the vicinity of an outer periphery of the magnetic disk 22, but it may adopt a contact start stop (hereinafter refer to "CSS") system. An AHSA 100 includes an HSA 102, an actuator arm 104, a coil support 106, a pivot bearing housing 116, and a voice coil 108 which is held by the coil support 106. The AHSA 100 is mounted to the base 24 so as to be pivotable in both A1 and B1 directions through a pivot shaft 110 and a pivot cartridge. The actuator arm 104, the coil support 106, and the pivot bearing housing 116 serving as a pivot cartridge mounting portion, are formed integrally by molding.

The HSA 102 comprises a load beam 112 attached to the actuator arm 104 and a flexure 114 attached to the load beam. A margin lip 28 or a tab is attached to a tip or distal end of the load beam 112. A head/slider (not shown) is attached to the flexure 114. The head/slider is composed of a head and a slider to which the head is attached. The head is composed of a read head for reading data and a write head for writing data, and it may be of a type that is used in common for both writing and reading.

The present invention is also applicable to a magnetic disk drive provided with only a write head or a read head and used exclusively for writing or reading, respectively. The slider has an ABS on its side opposed to the magnetic disk 22 which ABS undergoes buoyancy from an air flow created on the surface of the magnetic disk 22 during rotation of the disk. Under the action of the ABS the head/slider can float above the recording surface with a small spacing kept therebetween. The head/slider is attached to the flexure in such a manner that the ABS is opposed to the recording surface of the magnetic disk 22. The load beam 112 produces a pressure (pushing load) in a direction in which the head/slider is pressed against the recording surface of the magnetic disk 22. The pressing load and the buoyancy which the ABS undergoes are balanced to define a floating height.

The coil support 106 which holds the voice coil 108 is provided at a rear end of the AHSA 100. An upper voice coil yoke 32 is supported by the base 24 so as to cover the coil support 106 from above. Further, a lower yoke (not shown) is provided on the base 24 in opposition to the voice coil yoke 32. Thus, the upper and the lower yoke constitute a pair of yokes. A voice coil magnet (not shown) is attached to the lower yoke and a yoke gap is formed between the lower and the upper yoke. The voice coil magnet may be attached to one or both of the upper and lower yokes.

The pair of yokes and the voice coil magnet constitute a voice coil magnetic circuit, and the voice coil magnetic circuit and the voice coil 108 constitute a VCM. The voice coil 108 is disposed within a magnetic field of the yoke gap formed by the yokes and the voice coil magnet. An electric current is allowed to flow in the voice coil, and the direction and magnitude of the electric current are controlled, whereby the AHSA 100 can be pivoted in A1 or B1 direction at a controlled speed and acceleration.

An outer crash stop 34 and an inner crash stop 36 each containing an elastic material such as rubber are provided below the voice coil yoke 32 so as to be erected from the base 24 or the lower yoke. The outer crash stop 34 and the inner crash stop 36 function as limiting members for limiting a maximum pivoting range of the AHSA 100. The outer crash stop 34 limits the direction (A1 direction) in which the head/slider pivots outside the magnetic disk 22, while the inner crash stop 36 limits the direction (B1 direction) in which the head/slider pivots toward the spindle shaft 26. The ramp 30 is formed by a combination of a flat surface and a slant surface in such a manner that the margin lip 28 slides on the surfaces, permitting retraction of the head/slider, before the buoyancy of the ABS vanishes upon stop of rotation of the magnetic disk 22.

Explanation of Actuator Arm Unit

Figure 4:
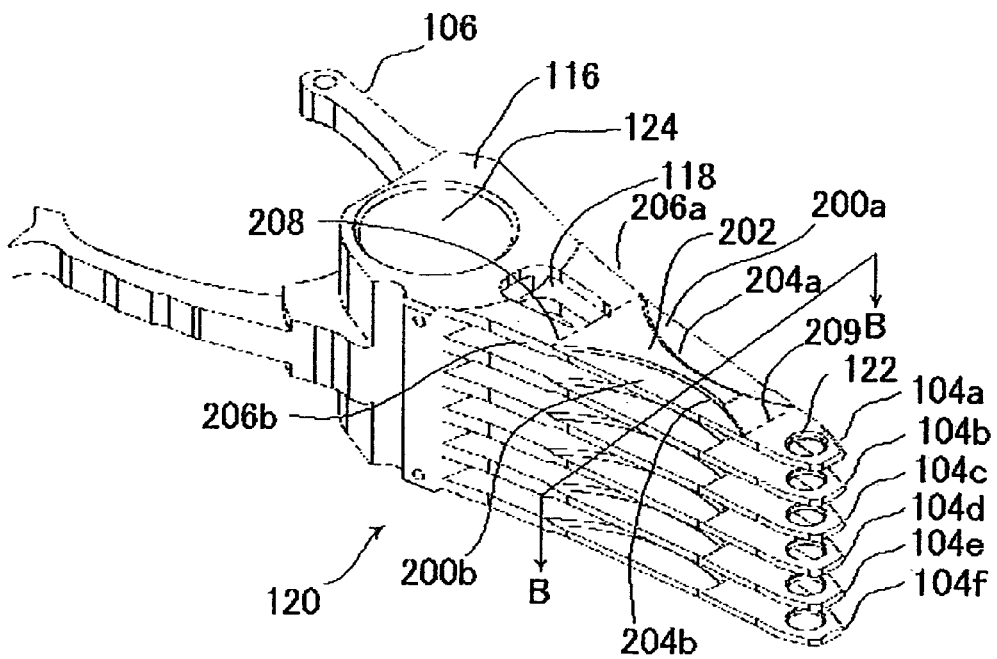
FIG. 4 is a perspective view of an actuator arm unit employed in the embodiment.

FIG. 4 is a perspective view of an actuator arm unit 120 which constitutes the AHSA 100 described above in connection with FIG. 3, and FIG. 5 is a sectional view taken on line B-B in FIG. 4. The actuator arm unit 120 includes actuator arms 104a to 104f, the pivot bearing housing 116, and the coil support 106. The six actuator arms 104a to 104f are of a mutually separated stack structure contiguous to the pivot bearing housing 116. A pivot cartridge is inserted into a pivot aperture 124 so that the AHSA 100 can pivot about the pivot shaft 110 with the driving force of the VCM.

Since the five stacked magnetic disks 22a to 22e have ten recording surfaces in total, ten sets of HSAs 102 are provided for the actuator arms 104a to 104f so as to be associated with the respective recording surfaces. When the head accesses the recording surface of the magnetic disk 22, the five magnetic disks 22a to 22e are each present between the associated actuator arms 104a to 104f. One set of HSA 102 is attached to each of the top and bottom actuator arms 104a, 104f and two sets of HSAs are attached to each of the other four actuator arms 104b to 104e which are located inside the top and bottom actuator arms. On the tip or distal end side of the actuator arms 104a to 104f there are formed swaging apertures 122 for connection of the HSAs 102 by swaging.

Each actuator arm 104 has an upper surface and a lower surface as main surfaces spreading in the pivoting direction of the actuator arm. A rigid area 202 and flow-uniformizing areas 200a and 200b are formed on each of the upper and lower surfaces. The main surfaces may be defined as surfaces of the actuator arm 104 opposed to a magnetic disk. The rigid area 202 is an area in which the thickness between the upper and lower surfaces of the actuator arm is large, and is formed in such a manner that the center thereof is aligned with a virtual center line connecting the center of the pivot aperture 124 with the center of each swaging aperture 122. The rigid area 202 mainly plays the role of retaining the rigidity of the actuator arm 104. However, a rigid area wherein the center line of the rigid area and the virtual center line are not in alignment with each other is also included in the scope of the present invention. The flow-uniformizing areas 200a and 200b are areas in which the thickness between the upper and lower surfaces of the actuator arm is smaller than that of the rigid area 202, and mainly play the role of reducing the weight of the actuator arm 104 and diminishing a change in flow velocity of an air flow. A portion on the side of the swaging aperture 122 and a portion on the side of the pivot aperture 124 in the actuator arm are here refer to as the tip end portion and the base end portion, respectively.

In this embodiment, the flow-uniformizing areas 200a and 200b are formed on both sides of the rigid area 202 in a symmetric shape with respect to a longitudinal center line. However, an actuator arm in which flow-uniformizing areas are formed asymmetrically on both sides of the rigid area and an actuator arm in which a flow-uniformizing area is formed on only one side of the rigid area, are also included in the scope of the present invention. The flow-uniformizing areas 200a and 200b are adjacent to the rigid areas 202 at respective boundaries 204a and 204b and are formed so as to extend longitudinally up to the side ends 206a and 206b of the actuator arm. The boundaries 204a and 204b are provided with respective slant surfaces 210a and 210b (see FIG. 6). The rigid area 202 is defined as an increased thickness lying between a virtual line 208 joining the respective most proximal positions of the boundaries 204a and 204b between the flow-uniformizing areas and the rigid area and a virtual line 209 joining the respective most distal positions of the boundaries 204a and 204b. In the case where a flow-uniformizing area is provided on one side of the rigid area, the rigid area is defined as an area which is adjacent to the flow-uniformizing area in the longitudinal direction. A flow-uniformizing area 200 is defined as an area which is formed on the main surface of the actuator arm 104 up to the side ends of the actuator arm in adjacency to the rigid area and which is thinner than the rigid area.

In this embodiment, balance apertures are not formed in the flow-uniformizing area 200 and the rigid area 202, but instead the flow uniformizing area 200 is formed thinner than the rigid area 202 to take weight balance of the entire AHSA. It is effective to set the area of the flow-uniformizing areas 200a and 200b at a value of about 10% to 70% of the total area of both area of the flow-uniformizing areas 200a, 200b and area of the rigid area 202. A preferred value of the area in question is about 30% to 70%, which is suitable for reducing the weight of the actuator arm 104 and ensuring the rigidity thereof. In this embodiment, the rigid area 202 and the flow-uniformizing areas 200a, 200b are substantially flat surfaces, and those formed on the upper surface of the actuator arm and those on the lower surface are parallel to each other in order to facilitate machining. The substantially flat surface means a flat surface which may be somewhat uneven in terms of machining. Selecting the thickness of the flow-uniformizing area 200 in the range of about 30% to 70% of the thickness of the rigid area 202 is particularly effective in taking weight balance and suppressing the arm fluttering. In the present invention, the flow-uniformizing area 200 may therefore be formed so as to be inclined from the side ends 206 to the rigid area 202. Alternatively, the flow-uniformizing area may be changed in thickness so as to create a difference in height insofar as its thickness is smaller than the rigid area.

In the case where with only the formation of the thin flow-uniformizing areas 200a and 200b it is virtually impossible to take weight balance of the actuator arm unit 120 or the AHSA 100, there may be formed a supplementary balance aperture 118. The balance aperture 118 pierces through the actuator arm from the upper to the lower surface on the longitudinal center line and is located at a portion on the proximal side with respect to the rigid area 202 which is defined by the virtual line 208. The proximal portion of the actuator arm is a wide portion contiguous to the pivot bearing housing 116 and is high in rigidity. Therefore, even if the balance aperture 118 is formed therein, there is little influence on arm fluttering and an advantage in weight balance can accrue. However, the present embodiment includes a configuration in which the flow-uniformizing areas 200a and 200b are expanded toward the proximal portion or the shape thereof is changed to enlarge the reduced thickness, thereby eliminating the balance aperture.

If the flow-uniformizing areas 200a and 200b are formed in a symmetric shape with respect to the longitudinal center line, the masses on both sides of the center line become equal to each other, so that the oscillation characteristic against torsion of the actuator arm 104 is not deteriorated. In this embodiment the boundaries 204a and 204b between the flow-uniformizing areas and the rigid area are formed in an arcuate shape, which shape, as will be described later, is not only effective in suppressing the arm fluttering but also extremely easy to machine. The arcuate boundary shape is also suitable for enlarging the area of the rigid area on the proximal side of the actuator arm to improve rigidity. In the case of forming the balance aperture 118, the shape in question is suitable for enlarging the distance from the closest edge of the balance aperture to ensure rigidity.

It is possible to assume a natural frequency for the actuator arms 104a to 104f while a cantilever rigid structure model is assumed in which the pivot shaft 110 is used against a force acting in a direction perpendicular to the surfaces of the magnetic disks 22a to 22e. Generally, the smaller the mass of the tip end portion and the higher the spring rigidity, the higher the natural frequency of the cantilever. An increase in the natural frequency leads to a decrease in amplitude. Therefore, in the actuator arms 104a to 104f it is necessary that the arcuate boundaries 204a and 204b of the flow-uniformizing areas 200a and 200b be formed so as to overlap each other, which would prevent the rigid area 202 from being separated into the proximal side and the distal side. A portion around the swaging aperture 122 on the distal side of each of the actuator arms 104a to 104f is a little thinner than the rigid area 202 in order to ensure a high degree of mounting accuracy for the HSA 102, but there is not such an influence as a lowering of the natural frequency.

Motion of Air Flow in Flow-Uniformizing Area and Rigid Area

Figure 5:
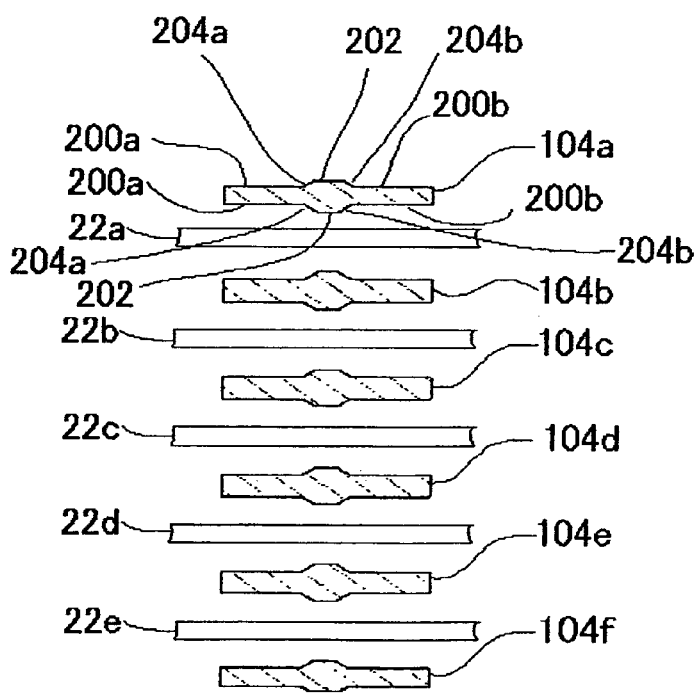
FIG. 5 is a sectional view taken on line B-B of the actuator arm unit shown in FIG. 4.
Figure 6:
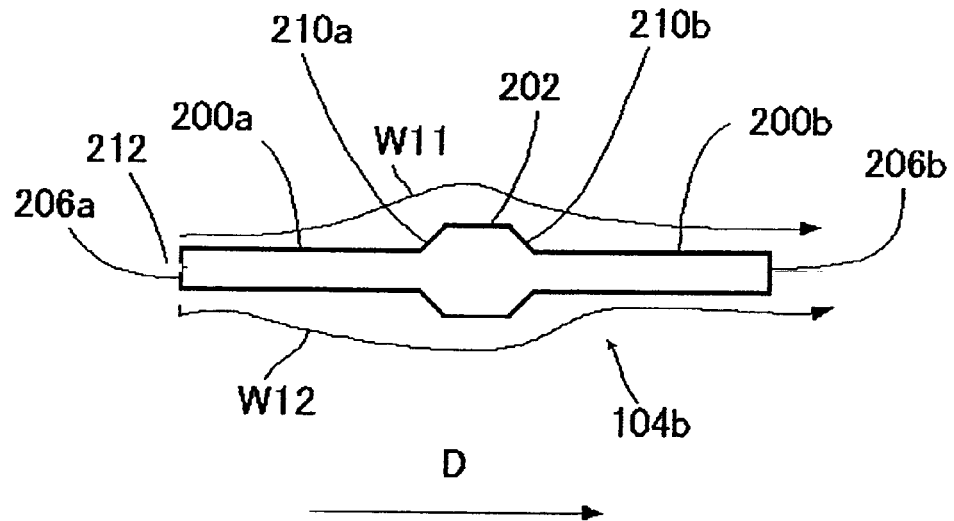
FIG. 6 is a diagram showing motions of air flows in flow uniformizing areas and a rigid area in an actuator arm used in the embodiment.

FIG. 6 is a diagram explanatory of operation of the flow uniformizing areas 200a, 200b and rigid area 202 of the actuator arm 104b shown in FIG. 5. The actuator arm 104b has an upper surface and a lower surface which are formed in a symmetric shape with respect to a virtual center plane 212. In the following description, therefore, reference numerals are assigned for only the upper surface, and they hold true for the bottom surface. In addition, they also hold true for the upper and bottom surfaces of the other actuator arms. As magnetic disks 22a and 22b rotate in the direction of arrow D, there are created air flows W11 and W12 on the upper and lower surfaces, respectively, of the actuator arm 104b. The air flows W11 and W12 move from the side end 206a to the side end 206b, that is, from left to right in FIG. 6. In the actuator arm 104b, balance apertures are not formed in the rigid area 202 and the flow uniformizing areas 202a, 202b, and therefore such a balance aperture-induced turbulent flow as has been described above in connection with FIG. 2 does not occur. In FIG. 6, the portions where turbulent flows occur due to a change in flow velocity are the side ends 206a, 206b and slant surfaces 210a, 210b. However, in comparison with the side ends 206a and 206b which are orthogonal to the air flow W11, the slant surfaces 210a and 210b are of a structure difficult to develop a turbulent flow because of little change in flow velocity.

Figure 2:
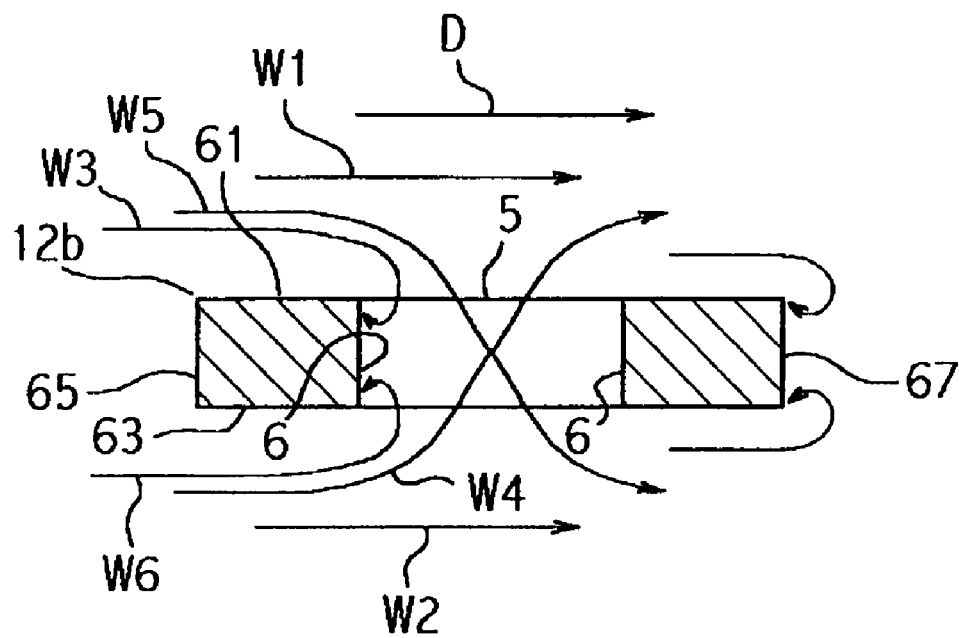
FIG. 2 is a diagram explaining motions of air flows in a balance aperture formed in the AHSA shown in FIG. 1.

Further, in comparison with the conventional actuator arm shown in FIG. 2, the thickness of the flow uniformizing area 200 is about 30% to 70% of the thickness of the rigid area 202, so that the area of the side end 206a decreases at its portion orthogonal to the air flow with the result that the force which the side end 206a receives from the air flow also decreases. The magnitude of a change of the force acting on the actuator arm 104b due to a turbulent flow is probably roughly proportional to the force based on the air flow. In addition, the force which the actuator arm 104b undergoes from the air flow appears as a change in rotational torque centered on the pivot shaft 110. The rotational torque acting on the actuator arm 104b is proportional to the distance between the pivot shaft 110 and the actuator arm 104b. Thus, if the balance aperture 118 is formed on the proximal side close to the pivot shaft 110, the influence thereof is less than in the case of forming the balance aperture on the distal side even if there occurs a turbulent flow therein. On the distal side distant from the pivot shaft 110, the air flow does not exert a great change of torque on the actuator arm 104.

Figure 7:
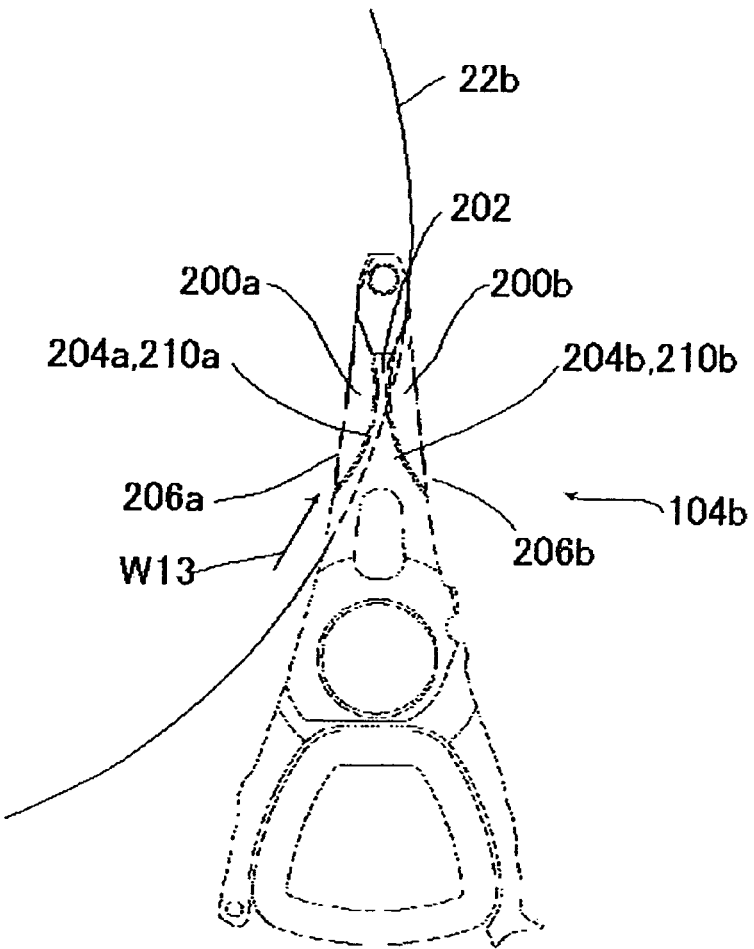
FIG. 7 is a diagram showing motions of an air flow in the flow uniformizing areas and the rigid area.

FIG. 7 is a diagram explaining motions of an air flow created by the magnetic disk 22 during high-speed rotation in the flow uniformizing area 200 which has arcuate boundaries 204a and 204b formed on the actuator arm 104b. In connection with FIG. 6 as a cross-sectional view, there has been explained the state in which an air flow collides with the side end 206a and the slant surface 210a of the actuator arm 104b. On the other hand, in FIG. 7 there will be explained planar air flow motions with respect to the actuator arm 104b which is influenced by an air flow created from the magnetic disks 22a and 22b. This also holds true for the other actuator arms.

An air flow created on the surface of the magnetic disk 22 during rotation of the disk moves in the circumferential direction of the disk, i.e., in the track direction. As shown in FIG. 7, as the actuator arm 104b is moved to the outer peripheral track side of the magnetic disk 22, an air flow W13 generated on the magnetic disk 22 enters the side end 206 obliquely at a small incidence angle. It is presumed that the air flow is separated into a component advancing toward the flow uniformizing area 200a from the side end 206a and a component which bends toward the spindle shaft 26 of the magnetic disk 22 as a result of collision thereof with the side end 206a.

As shown in FIG. 6, it is probable that the air flow advancing toward the flow uniformizing area 200a from the side end 206a is separated into a component that collides with the boundary 204a and bends along the slant surface 210a and a component that gets over the rigid area 202. The flow uniformizing area 200a of the actuator arm 104b in this embodiment is provided with the arcuate boundary 204a between the rigid area and the flow uniformizing area, so that the air flow component that collides with the slant surface 210a formed in the boundary 204a and bends can move along the arcuate boundary. This tendency becomes more conspicuous as the actuator arm 104 approaches the outer peripheral track on the magnetic disk 22 where the velocity of the air flow is high. Thus, it can be said that this structure is suitable for suppressing the arm fluttering.

Also even the air flow component that gets over the rigid area 202 takes an obliquely rising posture along the slant surface 210a. It therefore rises at a smaller angle than the angle of the machined slant surface, that is, it gets over a gentle slant surface, whereby the change in flow velocity of the air flow becomes smaller. Also even the air flow moving from the rigid area 202 to the flow uniformizing area 200b moves down to the flow uniformizing area 202b at an angle gentler than the angle of the machined slant surface and along the arcuate boundary 204b, so that the change in flow velocity of the air flow is small. Thus, in the flow uniformizing area 200 which has the arcuate boundary 204 between the rigid area 202 and the flow uniformizing area 200, it is possible to decrease a change in velocity which occurs when the air flow changes its direction, and hence possible to prevent the occurrence of a turbulent flow.

How to Fabricate the Actuator Arm Unit

The actuator arm unit 120 according to this embodiment is fabricated by integrally machining the six actuator arms 104a to 104f, pivot bearing housing 116 and coil support 106. This is intended for application to a plural disk stack which is required with an increase in storage capacity of the magnetic disk drive. Aluminum is generally used as the material of the actuator arm unit 120. Aluminum is suitable for being machined after die casting to fabricate the actuator arm unit. The actuator arm unit may also be fabricated by using a rigid plastic material, subjecting it to extrusion or drawing and a subsequent machining finish. In this embodiment, first aluminum is subjected to die casting in an external form which is continuous in the axial direction of the pivot shaft 110 to form a rod-like actuator stock.

The rod-like actuator stock thus obtained is first subjected to machining for external shape and then subjected to simultaneous cutting for plural actuator arms 104 which require a high degree of accuracy. Since each actuator arm 104, which is a small, but elongate part, is subjected to machining while being integral with the pivot bearing housing 116, it is necessary to take care so as not to induce any influence of a thermal strain. Therefore, first as a primary process, plural milling cutters of sharp edges, called gang cutter, are arranged accurately, and to form flow uniformizing areas 200 of a large mutual spacing together with the slant surfaces 210 in the shape of adjacent actuator arms 104, the actuator stock is cut one side at a time. In this case, both sides may be cut simultaneously. In the primary process, heat is dissipated to a satisfactory extent because the amount of the stock is sufficient, thus permitting a relatively heavy cutting. In this sense, cutting the flow uniformizing areas 200 first is effective.

Cutting traces of the sharp-edge milling cutters serve as they are as boundaries 204a, 204b and slant surfaces 210a, 210b. Going through the primary process of forming the flow uniformizing areas permits diminishing the cutting load in the secondary and subsequent processes to lessen the machining heat for the stock. To separate the adjacent actuator arms 104 and form a rigid area, it is necessary to select a direction in which the machining heat is transmitted uniformly. Therefore, the stock is cut several times from the tip end swaging hole side along a longitudinal center line by means of cutters (gang cutter) of different outside diameters to form an actuator arm 104. Thereafter, as needed, balance aperture 118 and swaging aperture 122 are formed, and a finishing process is performed. The balance aperture 118, etc. may be formed in the stage of forming the actuator stock. Thus, since the actuator arm unit 120 according to this embodiment has the flow uniformizing area 200 which is adjacent to the rigid area 202 at the arcuate boundary 204, there accrues an advantage that the machining is not so complicated even in comparison with the conventional structure wherein balance apertures are formed like a ladder.

Another Embodiment

Figure 8:
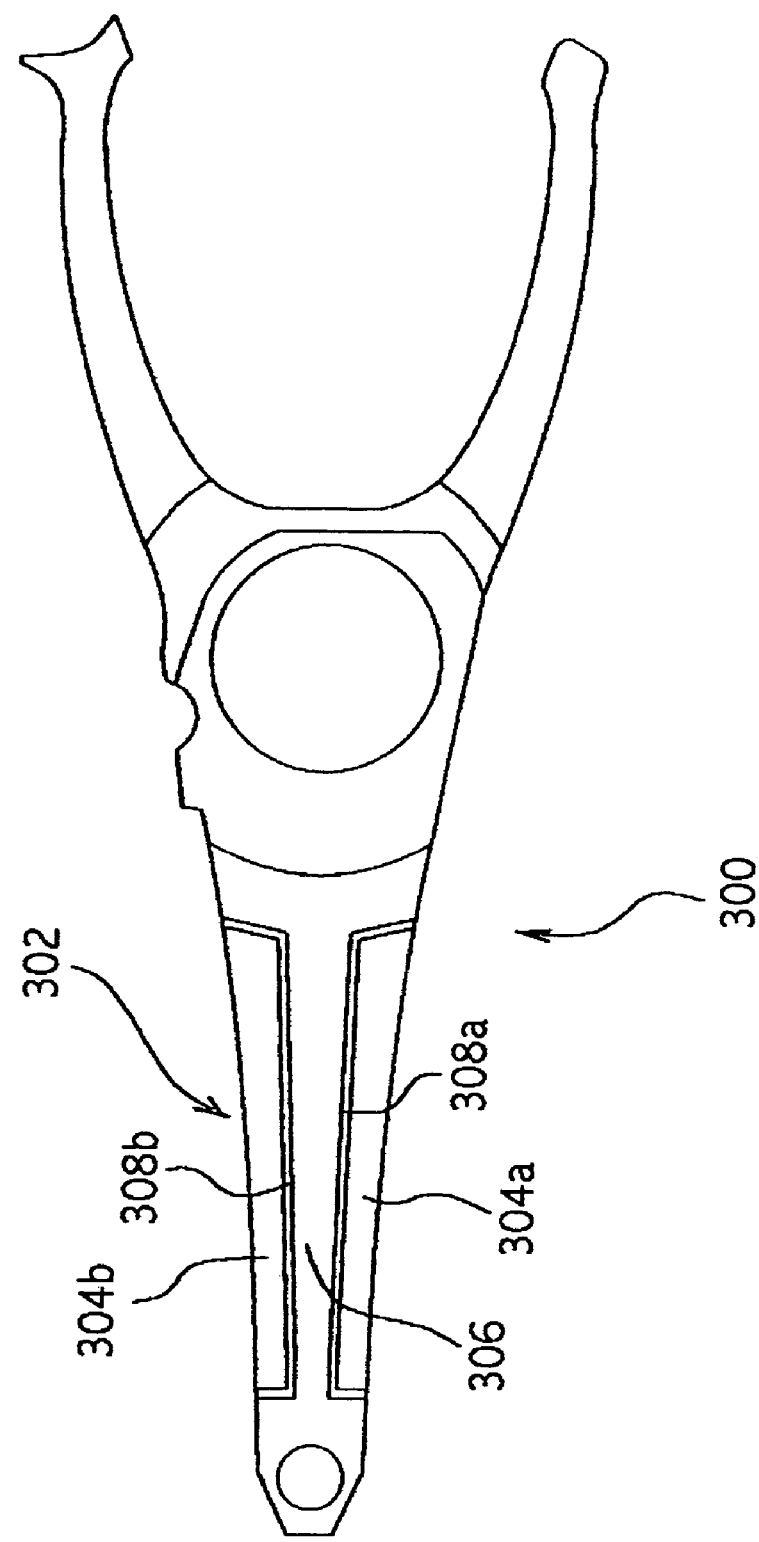
FIG. 8 is a plan view of an actuator arm according to another embodiment of the present invention.

FIG. 8 is a plan view of an actuator arm unit 300 according to another embodiment of the present invention. A main surface of an actuator arm 302 is provided with a rigid area 306 at a portion extending longitudinally centrally thereof and flow uniformizing areas at portions extending on both sides of, longitudinally in adjacency to the rigid area 306. The flow uniformizing areas 304 and the rigid area 306 are formed also on the other main surface corresponding to the back side of FIG. 8. The flow uniformizing areas 304 and the rigid area 306 are each formed in a substantially flat shape. The flow uniformizing areas 304 and the rigid area 306 formed on the obverse main surface and those formed on the reverse main surface are approximately parallel to each other. The thickness of the flow uniformizing areas is about 30% to 70% of the thickness of the rigid area. Also in this embodiment, if the area of the flow uniformizing areas 304a and 304b is set at about 10% to 70% of the total area of both area of the flow uniformizing areas 304a, 304b and area of the rigid area 306, it is possible to reduce the weight of each actuator arm and ensure the rigidity thereof.

In the actuator arm unit 300 of this embodiment, a balance aperture is not provided, but instead boundaries 308a and 308b between the flow uniformizing areas and the rigid area are formed rectilinearly. Slant surfaces may be formed in the boundaries. Instead of forming a balance aperture, the flow uniformizing areas 304a and 304b are extended longitudinally to the proximal side to a greater extent than in the embodiment illustrated in FIG. 4 to take weight balance. The flow uniformizing areas having such a shape of boundaries can be formed by die casting or machining, but machining thereof is generally difficult in comparison with arcuate boundaries. However, the omission of a balance aperture permits suppression of the arm fluttering and there can be obtained such effects as the reduction of weight and a decrease of a change in flow velocity of an air flow. The actuator arm having such a shape of flow uniformizing areas is also included in the concept of the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A rotating disk storage device comprising:
   a rotating disk storage medium supported rotatably on a base;
   a head accessible to said rotating disk storage medium; and
   an actuator arm carrying said head thereon and supported on said base for pivoting movement, said actuator arm including an integral main surface spreading in a pivoting direction thereof, said main surface having a longitudinally centrally extending rigid area and a flow uniformizing area adjacent to said rigid area and thinner than said rigid area, said flow uniformizing area being formed in a longitudinally extending, substantially flat shape and parallel to said rigid area,
   wherein said main surface includes a slant surface formed unitarily of the same material as the actuator arm with an oblique slope at a boundary between said flow uniformizing area and said rigid area; and wherein the oblique slope is formed at a lateral side of said rigid area.

2. A rotating disk storage device according to claim 1, wherein said flow uniformizing area is formed on both sides of said rigid area.

3. A rotating disk storage device according to claim 1, wherein said main surface includes a first main surface and a second main surface, and said rigid area and said flow uniformizing area are formed on each of said first and second main surfaces.

4. A rotating disk storage device according to claim 3, wherein the flow uniformizing area formed on said first main surface is substantially parallel to the flow uniformizing area formed on said second main surface.

5. A rotating disk storage device according to claim 4, wherein said rigid area includes a substantially flat surface, and the thickness of said flow uniformizing area is in a range of about 30% to 70% of the thickness of said rigid area.

6. A rotating disk storage device according to claim 1, wherein said main surface includes an aperture in a position between said rigid area and a proximal portion of said actuator arm.

7. A rotating disk storage device according to claim 1, wherein said flow uniformizing area is adjacent to said rigid area along an arcuate boundary.

8. A rotating disk storage device according to claim 1, wherein an area of said flow uniformizing area is in a range of about 10% to 70% of a total area of the area of said flow uniformizing area and an area of said rigid area.

* * * * *